G. L. BANKS.
AUTOMATIC AIR GAGE.
APPLICATION FILED OCT. 24, 1918.

1,294,369.

Patented Feb. 18, 1919.

WITNESS:

INVENTOR.
George L. Banks,
BY Hazard & Miller
ATTORNEYS.

UNITED STATES PATENT OFFICE.

GEORGE L. BANKS, OF HUNTINGTON PARK, CALIFORNIA.

AUTOMATIC AIR-GAGE.

1,294,369.  Specification of Letters Patent.  Patented Feb. 18, 1919.

Application filed October 24, 1918. Serial No. 259,555.

*To all whom it may concern:*

Be it known that I, GEORGE L. BANKS, a citizen of the United States, residing at Huntington Park, in the county of Los Angeles and State of California, have invented new and useful Improvements in Automatic Air-Gages, of which the following is a specification.

My invention relates to an automatic air pressure gage.

An object of my invention is to provide a convenient air pressure gage for use in connection with pneumatic tires and the like.

Another object is to provide an air pressure gage which may be set to any desired pressure and which when that pressure is exceeded will automatically allow the air to escape, thus signaling the operator and insuring against excessive air pressure and accident.

With these and other objects in view my invention consists in the construction, combination and arrangement of parts hereinafter described and claimed.

In the accompanying drawings which form a part of this specification,

Figure 1:
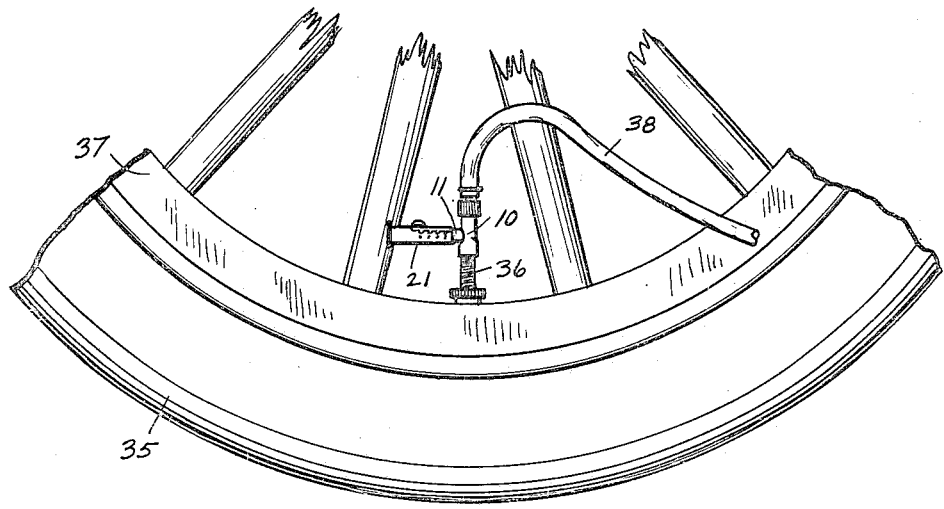
Figure 1 is a fragmentary view of a wheel equipped with a pneumatic tire, illustrating the application of my air pressure gage.

The gage consists of a connecting tube 10 with a branch tube 11 joined to its side approximately midway between its ends and at right angles to it. The connecting tube has a longitudinal bore 12 and a branch bore 13 leading from the longitudinal bore into the branch tube 11 which has an enlarged bore 14 forming a valve seat 15 at the end of the branch tube. A valve plunger 16 with a flanged head 17 equipped with a rubber sealing pad 18 is pressed against the seat 15 by a compressed coil spring 19 the outer end of which presses against the end wall 20 of a registering tube 21 which telescopes over the branch tube 11. A center pin 22 is fixed in the end wall 20 of the registering tube to hold the spring in place.

The lower end of the connecting tube 10 is provided with a socket 23 in which a rubber gasket 24 is fixed. A threaded nipple 25 is formed on its upper end thus providing a means for connecting it with an air supply hose. Vent holes 26 are drilled in the end wall 20 of the registering tube. The registering tube has a longitudinal slot 27 cut in one side and a series of side slots 28 and 29 on each side of said longitudinal slot, the side slots being cut at a slightly oblique angle to the longitudinal slot, so as to form lugs or hooks 30 and 31 on each side of the longitudinal slot. A screw 32 which serves as a stop pin is screwed into the branch tube 11 in position to register with the longitudinal slot 27 and the side slots 28 and 29, in the registering tube, and to hold the tube from outward movement by engagement with the lugs or hooks 30 and 31.

The coil spring being so made that its compression is directly proportional to the force applied upon it, the side slots 28 and 29 which represent equal successive pressure intervals are equally spaced from each other. Figures 33 and 34 indicating the air pressure which corresponds to the different degrees of compression of the spring are stamped in the registering tube adjacent the side slots, the figures increasing from the inner toward the outer end of the tube.

Fig. 1 shows a tire 35 having a tire valve tube 36, the tire being mounted on a wheel 37. The air gage is shown attached to an air supply hose 38.

Figures 2, 3:
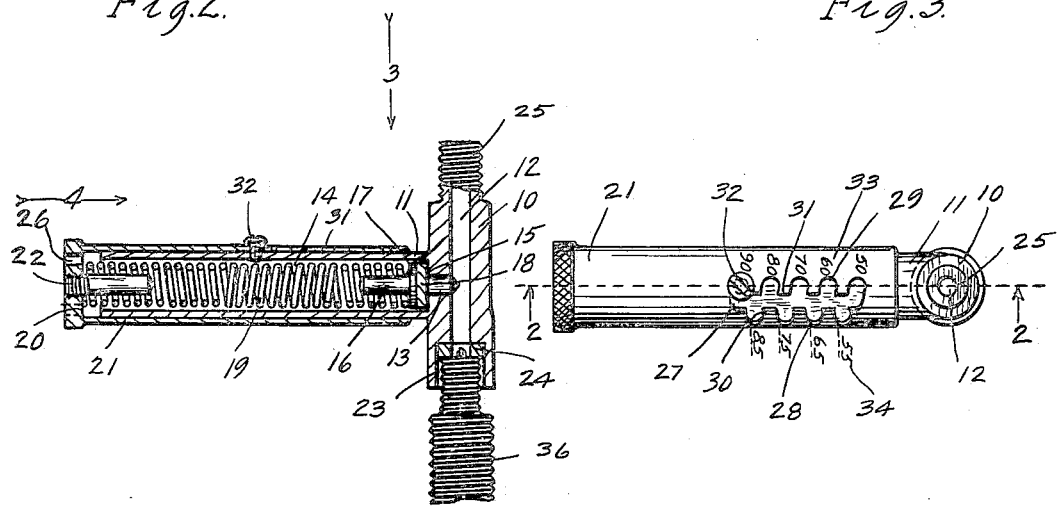
Fig. 2 is a central vertical sectional view of an air pressure gage embodying the principles of my invention and further illustrating its application to a tire valve tube, the section being taken on the line 2—2 of Fig. 3.
Fig. 3 is a view in elevation of the air pressure gage shown in Fig. 2 as seen looking in the direction indicated by arrow 3 in Fig. 2.
Figure 4:
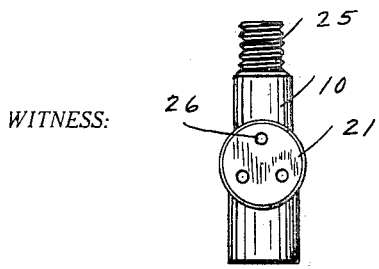
Fig. 4 is a view in elevation of the pressure gage shown in Figs. 2 and 3 as seen looking in the direction indicated by arrow 4 in Fig. 2.

Operation: The nipple 25 of the connecting tube 10 of the gage is screwed into the socket of an air supply hose 38 as illustrated in Fig. 1. The registering tube 21 is turned and shifted on the branch tube 11 until the screw 32 enters a slot 28 or 29 which indicates the desired pressure. The cap is removed from the tire valve tube 36 and the socket end 23 of the connecting tube is pressed downwardly upon the tire valve tube as is clearly shown in Fig. 2. Air flows through the longitudinal bore 12 of the connecting tube into the tire and at the same time presses against the plunger 18 through the branch bore 13. The plunger remains in its seated position until the air pressure exceeds the pressure of the plunger spring 19, whereupon the plunger is forced outwardly against its spring thus permitting air to escape through the branch tube 11 and the holes 26 in the end wall of the registering tube. The sound of the escaping air announces to the operator that the required pressure has been obtained and the gage is removed from the tire valve tube.

While I have shown the preferred construction of my automatic air pressure gage as now known to me, it will be understood that various changes in construction, combination and arrangement of parts may be made by those skilled in the art without departing from the spirit of my invention as claimed.

I claim:

1. In an automatic air pressure gage, a connecting tube having a three-way passage; a branch tube extending from the connecting tube around one passage, there being a valve seat at the inner end of the branch tube; a registering tube slidably telescoping over the branch tube and having a closed outer end, and having a longitudinal slot and a series of side slots; a stop pin fixed in the branch tube through the longitudinal slot and adapted to move into the side slots; a valve against the valve seat; and a spring in the branch tube against the valve and against the head of the registering tube, so that the registering tube may be manually grasped and moved to bring the stop pin into the desired side slot to regulate the pressure of the spring upon the valve.

2. In an automatic air pressure gage, a connecting tube having a three-way passage; a branch tube extending from the connecting tube around one passage, there being a valve seat at the inner end of the branch tube; a registering tube slidably mounted upon the branch tube and having a closed outer end and having a longitudinal slot, and side slots extending both ways from the longitudinal slot, the slots of one side being staggered relative to the slots of the other side; a stop pin fixed in the branch tube through the longitudinal slot; a valve against the valve seat; and a spring in the branch tube between the valve and the head of the registering tube, so that the registering tube may be manually grasped and operated to bring the stop pin into the desired side slot to regulate the pressure of the spring.

In testimony whereof I have signed my name to this specification.

GEORGE L. BANKS.